United States Patent [19]
Hodges

[11] Patent Number: 4,595,070
[45] Date of Patent: Jun. 17, 1986

[54] CURSOR CONTROL SUPPORT DEVICE

[76] Inventor: Richard P. Hodges, 771 Kiowa Rd., Pinewood Springs, Lyons, Colo. 80540

[21] Appl. No.: 625,024

[22] Filed: Jun. 27, 1984

[51] Int. Cl.⁴ .............................................. B60V 1/00
[52] U.S. Cl. .................................... 180/125; 340/710
[58] Field of Search ................ 180/125, 116; 340/710, 340/709; 364/190

[56] References Cited

U.S. PATENT DOCUMENTS

| | | | |
|---|---|---|---|
| 3,437,168 | 4/1969 | Grassl | 180/125 |
| 3,892,963 | 7/1975 | Hawley et al. | 340/710 |
| 4,303,914 | 12/1981 | Page | 340/710 |
| 4,464,652 | 8/1984 | Lapson et al. | 340/709 |

FOREIGN PATENT DOCUMENTS 2038922 7/1980 United Kingdom ............... 340/709

*Primary Examiner*—Harry Tanner
*Attorney, Agent, or Firm*—Jerry W. Berkstresser; Bruce G. Klaas

[57] ABSTRACT

A housing for a computer mouse device which supports the mouse above a working surface on a cushion of air or other gaseous fluid including a support device having incorporated therein structure for the distribution of the fluid between the mouse and the working surface so as to enable support of the mouse device above the working surface.

6 Claims, 6 Drawing Figures

CURSOR CONTROL SUPPORT DEVICE

BACKGROUND OF THE INVENTION

This invention relates to computer peripheral devices and more particularly to a method and a device for facilitating the use of a remote computer cursor director.

With the advent of computer hardware and software which utilizes cursor control, many manufacturers have provided the capacity in their equipment for the use of such devices. These devices are referred to euphemistically, in the singular, as a mouse.

A mouse is used for many different cursor control applications with a wide variety of computers and computer software, including icon-based software for graphs and the like, as well as for the growing field of computer controlled graphics.

The intensive use of a computer mouse for such demanding applications has become widespread and promises to become an extremely important segment of computer utilization and in particular personal computer utilization.

A major drawback to the current use of a computer mouse has been the fatigue associated with the precise movements required of the mouse. Extended use of a computer mouse while performing highly detailed work can produce operator tensions and associated fatigue, together with a reduction in operator performance.

OBJECTS OF THE INVENTION

It is therefore an objective of the present invention to provide a method and a device for enhancing the utilization of computer mouse devices.

It is a further objective of the present invention to provide a method and a device for controllably utilizing an electronic computer mouse device which includes the accurate performance of all of the computer cursor or pointer control functions contemplated for such devices.

BRIEF SUMMARY OF THE INVENTION

The foregoing and other objects and advantages are achieved by providing a pointer or cursor control device with a support means incorporating structure which communicates with a fluid supply means capable of supplying sufficient fluid flow to structure of the support means to raise the support above a surface to facilitate the continuous or intermittent movement of the device.

DETAILED DESCRIPTION OF THE DRAWINGS

Figure 1:
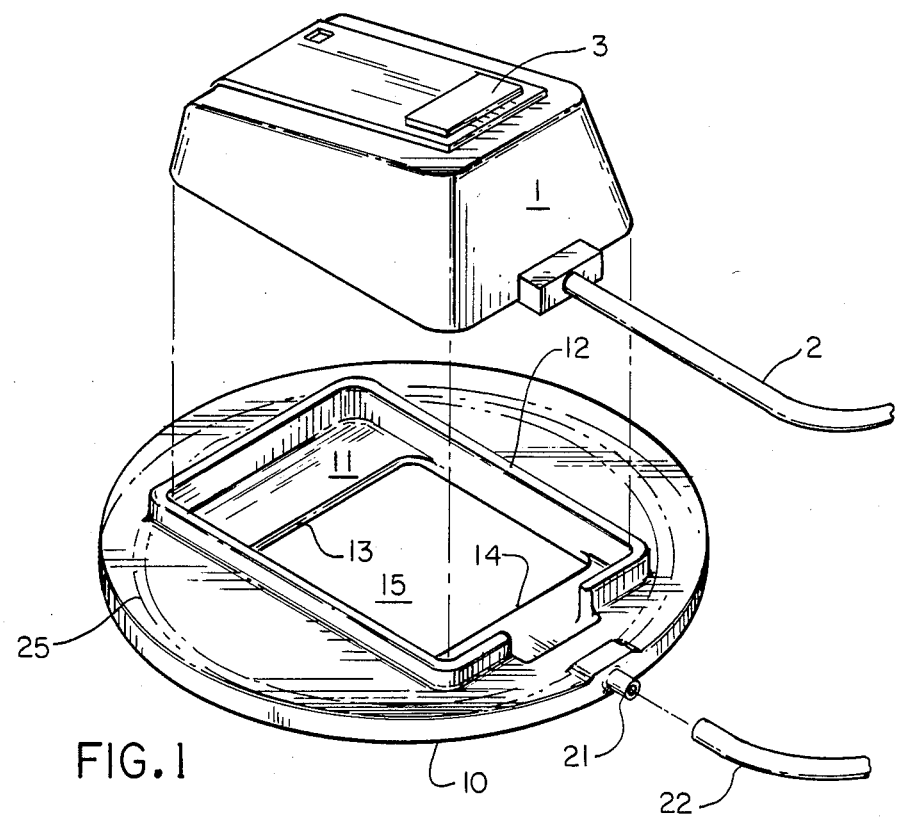
FIG. 1 is an exploded perspective view of a mouse and platform useful in the present invention.
Figure 2:
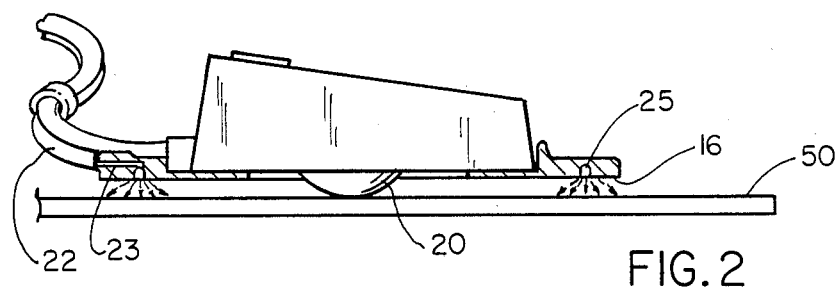
FIG. 2 is a partial cross-sectional view of the platform and mouse of FIG. 1 on a base plate.

A computer cursor or mouse 1 is shown in FIG. 1. A typical mouse 1 will have a wire 2 connecting the mouse to the personal computer 5, shown in FIG. 4. The mouse is used to move a pointer or cursor on the screen 6 of the personal computer 5 for conveniently performing certain menu-based or icon-based functions. Execution of the function is typically now accomplished by the operator depressing a momentary switch 3 located on the mouse.

In the present invention, a platform 10 is provided having a central recess 11 with dimensions to accept the mouse 1 in close fitting relationship therewith. In the embodiment shown, the thickness of the platform 10 is preselected to accommodate the channels and conduit required for operation of the invention, which will be described more fully hereinafter. The platform 10 is also provided with upstanding walls 12 defining the central recess 11 for accepting the mouse 1. Additional support structures 13 and 14 are provided as a base for the mouse 1 within the recess 11. An opening 15 is provided which communicates from the recess 11 through the bottom 16 of the base plate 12, so as to accommodate the sensing element 20 of the mouse 1 shown. One of the currently popular mouse devices in use is a mechanical mouse, as depicted herein. Other mouse devices can be accommodated with modified structures.

A mechanical mouse contains a track-ball as the movement sensing element. Such a ball is mounted in a box along with several position encoders. When the ball rolls across a surface, its rotation speed is approximately proportional to the speed at which a cursor moves upon a CRT screen. This enables the user to operate the cursor on the computer screen without necessarily using the keyboard 30. Directional data are also derived from the ball's motions. Other mouse designs employ optical or infrared and acoustic transponders and can be used in the invention described herein.

When someone uses a computer for drafting, he or she may spend many hours with the machine. During that period, if the computer is equipped with a mouse, the operator will use it to examine pull-down menus, move and position text, and create images. Intense concentration is necessary when making small cursor adjustments. The mechanical mouse typically exhibits a bit of stick-slip behavior, and that can be significant. In the case of the Apple "Lisa" computer, each pixel on the screen corresponds to 0.01 inch of movement.

In the first embodiment shown, the platform 10 is constructed of a one-eight inch average thickness acrylic or other plastic disk approximately 5½ inches in diameter which is provided with a nipple 21 for attachment of a hose 22.

Channel 23 in inside the nipple 21 and the disk communicates with a central annulus of the hose and with an annular groove 25 cut in the flat surface of bottom 16 of the platform 10. The groove is preferably circular shaped, having a diameter slightly less than the overall diameter of the platform in order to provide a uniform distribution of the fluid flow from a supply of air.

The size of the platform 10, the size and location of the recess 11 and the location of the groove 25 can all be altered within the practical functional limits established by the size and configuration of the mouse 1 and the desired function of the platform 10, as described herein, without undue experimentation.

Figure 4:
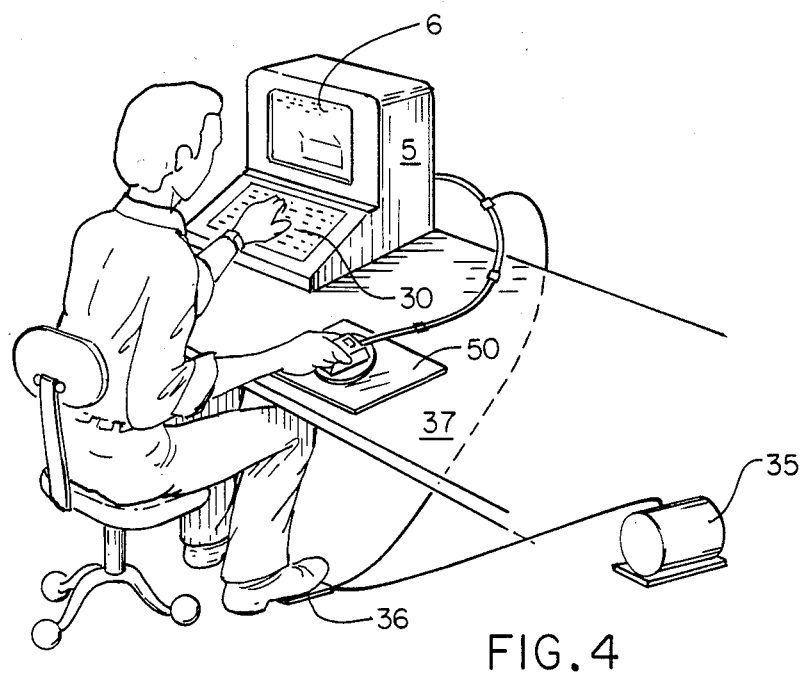
FIG. 4 is a perspective illustration of the system of the present invention in use with a personal computer.
Figure 5:
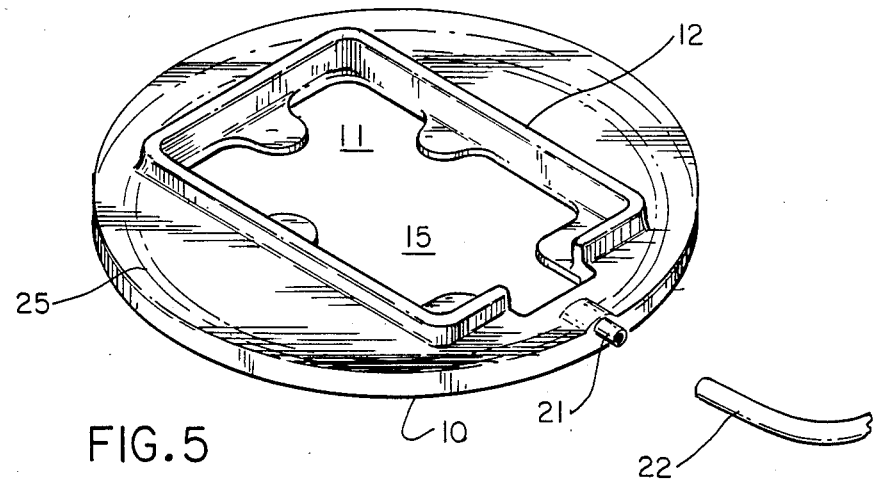
FIG. 5 is a perspective view of another embodiment of a platform useful in the present invention.

In the embodiment shown an air pump 35, FIG. 4, is provided, which can deliver an air flow of approximately four cubic feet per hour. Interruption of the air flow can be controlled by a foot control 36.

The foot control 36 incorporates a mechanism for varying the air flow to the platform 10.

Figure 6:
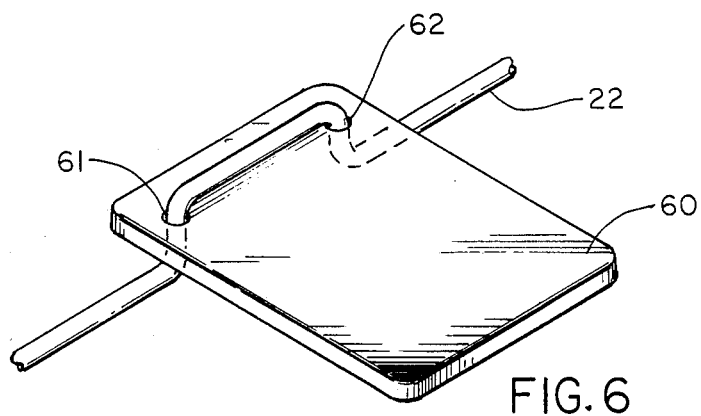
FIG. 6 is a perspective view of a foot switch which can be used in the practice of the present invention.

Referring to FIG. 6, the tubing 22 (FIG. 1) from the air or other fluid supply (35) can be arranged as shown to provide for control of the air flow to the platform 10. A base plate 60 is provided with two holes 61 and 62 through which are received the tubing 22 in the manner shown. When downward pressure is applied to the base plate 60 with an operator's foot, the tubing 22 will be collapsed, interrupting the flow of air to augment the pointer or cursor control function described herein.

Since, as previously described, the hand-mouse movements must sometimes be quite small, the foot control enables the user to extinguish the flow of air normally going to the platform 10 through the flexible tubing 22 to stop the movement of the platform. The foot control is, however, optional as some users will be able to operate the switch 3 on the mouse 1 without inadvertent additional movement of the cursor on the screen.

The air flow through the tubing 22, from the air supply 35, is conducted through the tubing 22, and conduit 23 on the platform 10 into the annular groove 25 to produce a cushion of air which enables the platform 10 to float above the base 50.

With the platform and air source described, the platform 10 will float approximately 0.004 inches (0.10 mm) above the base 50 when an air flow of 3 cubic feet per hour is provided. Up to 30 cubic feet per hour can be provided without objectionable results. At 25 to 30 cubic feet per hour the height obtained for the platform 10 will be approximately 0.007 inches (0.180 mm). In the case of the mechanical mouse shown, the configuration and air flow rates are adjusted so that the sensor ball 20 is in touching and rolling contact with the base 50 so that lateral movements of the mouse 1 and platform 10 are sensed and transmitted to the cursor on the screen 6.

Preferably, the base 50 is a separate sheet of acrylic plastic or glass that is placed on top of a desk or table work surface 37. With this arrangement, movement of the mouse 1 and platform 10 past the edge 51 of the base 50 will permit the normally uniform flow of air to escape, interrupting the supporting cushion of air under the bottom 16 of platform 10, dropping the bottom 16 of the platform 10 into contact with the base 50 and stopping unintentional movement of the platform 10, mouse 1 and consequently, the cursor or pointer on the CRT screen 6.

Figure 3:
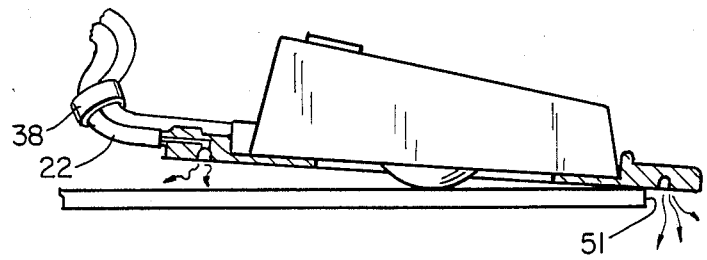
FIG. 3 is a partial sectional view of the platform and mouse overlapping the base plate shown in FIG. 2.

The lateral dimension of the base 50 is selected to accommodate the full screen movement of the cursor and the thickness is selected to provoke the interruption of the air cushion described. The position of the platform 10 and base 50 after interruption of the cushion is shown in FIG. 3. This feature permits the use of the device of the present invention on inclined work surfaces, not shown, so that inadvertent lack of control of the platform 10 will not permit the platform 10 and mouse 1 to slide off of the work surface.

As the system is illustrated in FIG. 4, an operator can utilize the present invention without substantial modification to the existing electronic connections for currently available cursor controllers. Preferably, the existing wiring can be used in combination with flexible 5/32 inch outside diameter silicone or other suitable tubing such as latex rubber, or the like, and clipped together with conventional wire bundle ties 38. The flexibility of the bundled wire and tubing should be adequate to prevent unwanted resistance on the platform 10 during use.

When constructing the platform 10 of the present invention, where a ⅛ inch average thickness acrylic plastic is used, and provided with a 1/16th inch wide and deep annular groove of about 4½ inches in diameter in the bottom 10 of platform 10, a 3 to 30 cubic foot per hour delivery rate of air to the conduit 23 will provide an air cushion of from about 0.004 inch (0.10 mm) to about 0.007 inch (0.180 mm) in thickness.

It is of course possible, using the teaching of the present invention, to assemble a mouse integrally in a housing which performs the functions described herein. In such a design, the electronic and pneumatic functions of the device would be the same and greater flexibility in the design for human use would be possible.

The materials selected for use herein are not limited to those described. Any suitable materials can be selected as long as the finished product performs the functions described.

What is claimed:

1. An air cushion support device for computer cursor control consisting of:
   computer cursor support means for use on a flat smooth surface;
   air supply means communicating with the said cursor support means capable of supplying a sufficient flow of air to support said support means on a cushion of air; and
   air distribution means located on said support means communicating with said supply means and the surface on which the computer cursor support means rests, said means being capable of distributing the air supplied by said air supply means in a manner so as to provide a uniform fluid cushion between said cursor support means and said surface.

2. The air cushion support device of claim 1 wherein:
   said air supply means includes control means for interrupting the supply of air to the air distribution means located on the support means.

3. The air cushion support device of claim 1 wherein:
   the air support means is provided with cursor control receiving means including upstanding wall means, which support means and receiving means are of a preselected size to permit communication between the cursor sensor and the surface.

4. The air cushion support means of claim 3 wherein said:
   support means further comprises a bottom surface whereby the cursor control receiving means, said air support means is operative, rides above said surface on a cushion of air when the air supply means is continuously supplying air to said destribution means.

5. A method for supporting a computer cursor control on a cushion of air comprising the steps of:
   supplying air to a support for a cursor control;
   distributing a sufficient amount of the air so supplied between the cursor support and a flat supporting surface to cause the cursor support to be uniformly raised above the supporting surface while permitting virtual contract between a cursor sensor element and the supporting surface.

6. A method for enhancing the precise omni-directional lateral movement of a computer cursor controller comprising the steps of:
   providing a cursor controller support with a bottom surface capable of matching a flat supporting surface;
   providing a source of air at between about three to about thirty cubic feet per hour;
   introducing the air in a uniform manner between the flat supporting surface and the bottom surface of the cursor controller support, whereby the cursor controller support is supported by a cushion of air above the flat supporting surface, thereby facilitating relavitly frictionless movement of the cursor controller support laterally over the flat supporting surface.

* * * * *